Jan. 17, 1950 Y. LION 2,494,820
IRRIGATION DITCH FORMING MACHINE
Filed Oct. 6, 1947
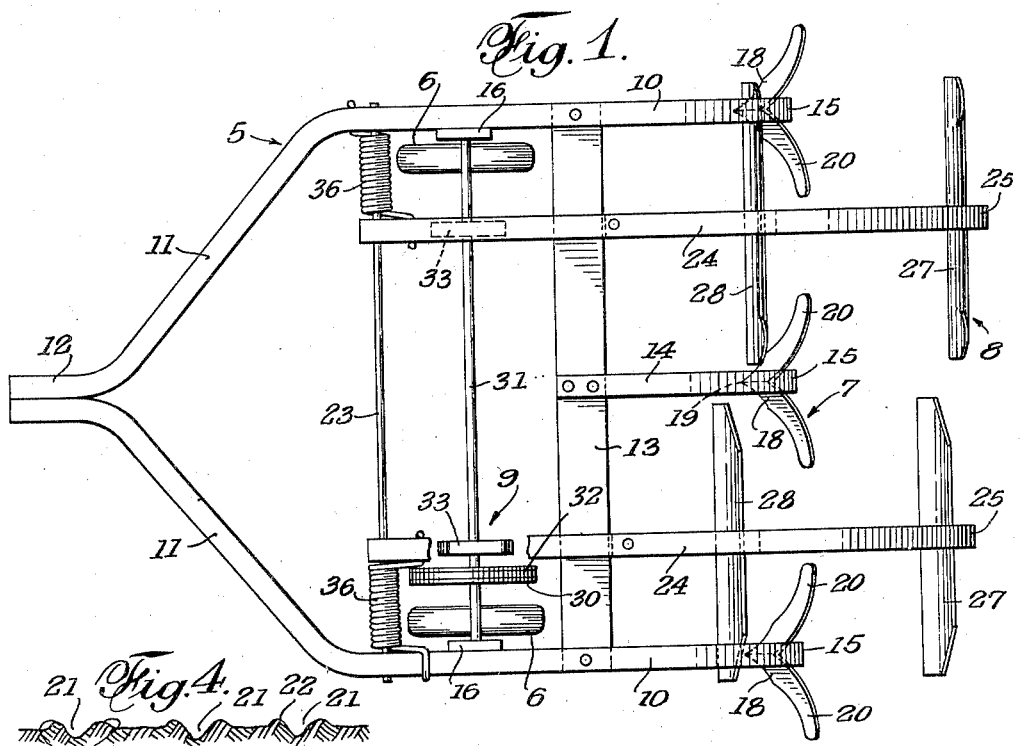
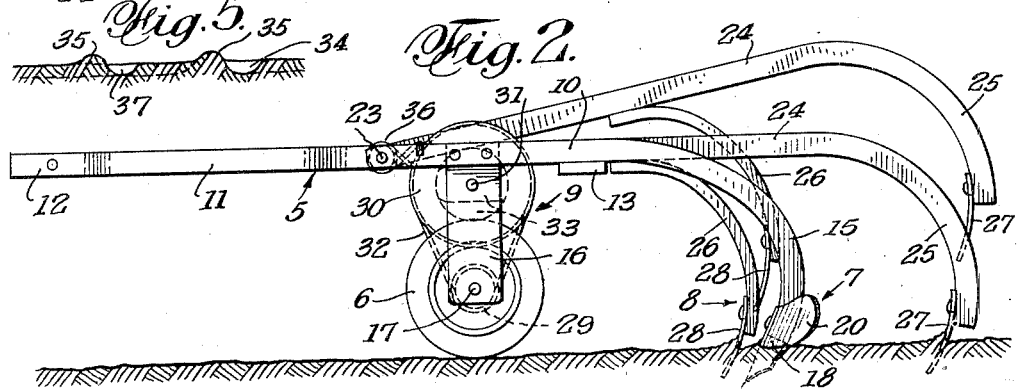
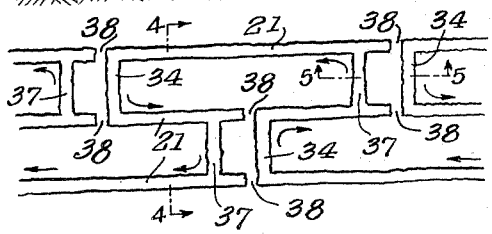
Inventor
YERVANT LION
By C. G. Stratton
Attorney Patented Jan. 17, 1950

2,494,820

UNITED STATES PATENT OFFICE 2,494,820

IRRIGATION DITCH FORMING MACHINE

Yervant Lion, Fresno, Calif.

Application October 6, 1947, Serial No. 778,163

6 Claims. (Cl. 97—55)

This invention relates to a machine for digging ditches and deals more particularly with a machine that will form an irrigation ditch between the rows of trees of an orchard.

Conventional ditches of the character indicated are straight and run off the water therein too fast for the ground to obtain desired soaking. Frequently, labyrinthine or circuitous ditches are dug with a commensurately great expenditure of time and effort for obtaining a better spread of water by slowing the flow thereof.

The present invention has for its primary object to provide a machine which, by a single pass along the ground, will dig an irrigation ditch of serpentine form, providing for an efficient spread and retardation of flow of water therein.

Another object of the invention is to provide a tractor-drawn machine that will dig a ditch that has the form of a Greek fret and is, therefore, circuitous or serpentine.

More specifically, the invention has for a further object to provide a ditch digger that forms at least three spaced longitudinal furrows and, simultaneously, scoops out the earth between the middle furrow and the flanking furrows along alternate longitudinally spaced points, the latter comprising alternately spaced cross channels that give the ditch the desired serpentine form.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a plan view of a ditch digger embodying features of the invention.

Fig. 2 is a side elevational view thereof.

Fig. 3 is a greatly reduced plan view indicating the character of the ditch that is formed by the machine.

Figs. 4 and 5 are somewhat enlarged cross-sectional views taken on the respective lines 4—4 and 5—5 of Fig. 3.

The ditch digger that is illustrated in the drawing comprises, generally, a frame 5 that is mounted to move along the ground on wheels 6, transversely spaced furrow forming means 7 carried by the frame 5 at the rear thereof to form spaced longitudinal furrows as the machine is moved along the ground, means 8 for digging or scooping out the earth between the furrows to form cross channel connections therebetween, and means 9 connected to be driven by wheels 6 for operating the means 8 in a manner whereby the cross channels are formed in alternate pairs on either side of the central furrow.

The frame 5 comprises side members 10 bent at 11 toward each other to join in a portion 12 that is adapted to be connected to a hitch for towing of the frame by a tractor or the like. A cross member 13 connects side members 10 and has affixed thereto, midway between said side members, a rearwardly extending member 14. The latter and the rear portions of the side members 10 are each similarly downwardly curved as at 15 for mounting the means 7. Approximately midway of said curved ends 15 and the portion 12, the frame, at each side, is provided with a bracket plate 16 that mounts wheels 6.

The wheels 6 are affixed to a transverse axle 17 and the latter has bearing at its ends in the bracket plates 16 and it will be evident that when drawing the frame, as by a tractor, the wheels 6 will turn to impart rotation to the axle 17.

The means 15 comprises a generally symmetrical plowshare 18 mounted on the lower end of each curved part 15 of the frame. Each plowshare is formed with a point 19 that first cuts the soil and with outwardly and upwardly directed moldboards 20 that mold the soil removed from the furrows 21, dug by points 19, into mounds or dams 22 on each side of each of said furrows. Fig. 4 shows the nature of the three furrows thus formed by the plowshares and it will be seen that they are of suitable depth to accommodate water for irrigation purposes.

The means 8 comprises a hinge rod 23 extending transversely between the frame side members 10, a pair of arms 24 extending from said rod rearwardly beyond the ends 15 of the frame and each, also, downwardly curved as at 25, a rearwardly extending downwardly curved member 26 fixed to each arm 24, a transversely arranged scoop 27 on the end of each curved part 25, and a similar scoop 28 on the end of each member 26. The scoops carried by each arm 24 extend transversely to span between the central plowshare and somewhat beyond the middle of the outer plowshares.

The arms 24 are freely pivoted on rod 23 and the means 9 is provided for raising and lowering the arms, alternately, so the scoops thereon cut into the soil to scoop out cross channels between the furrows 21. Said means 9 comprises a pulley 29 on axle 17, a larger pulley 30 on a shaft 31 above and co-extensive with said axle, a belt 32 connecting the pulleys, and a cam 33 on shaft 31 and disposed to engage each arm 24. It will be seen that rotation of the axle when the machine is drawn along the ground will impart rotation to cams 33. These latter are oppositely phased so that they alternately lift the arms during movement of the machine. However, the period, when said arms are in their lower position as controlled by the cams, is relatively short and the scoops 27 and 28 will simply scoop out cross channels 34 and 37 as best seen in Fig. 5 and form a mound 35 along the forward edge of each such channel.

The springs 36 that are shown may be omitted and may either be designed to counter-balance part of the weight of arms 24 or assist the cams 33 to lift said arms.

The scoops 28 are located forward of plowshares 18 and form cross channels 37 in advance of the furrows. The scoops 27 are located rearward of said plowshares and form cross channels 34 after the furrows are formed. It will be evident then that as the latter channels are formed, the mound of earth 35, scooped out, fills in the furrows, as at 38 and interrupts the longitudinal continuity of said furrows.

In operation, the machine is moved along the ground; the plowshares 18 form three parallel furrows 21; first one arm 24 moves down so its scoops 27 and 28 dig cross channel 34 and 37, respectively, to connect the center furrow with one side furrow; the scoop 27, performing its operation behind the plowshares, builds up dams 38 across each of said furrows; then said arm 24 moves up and as the machine progresses forward, the other arm 24 moves down to dig channels 34 and 37 connecting the center furrow and the other side furrows in a similar manner. Thus, as the machine progresses, a ditch of serpentine form and resembling a Greek fret is formed. Water in said ditch flows in the direction shown by the arrows of Fig. 3 to give desired spread of water and retardation of the flow thereof.

It will be noted from the foregoing that a novel and expeditious method for forming an irrigation ditch of serpentine form is provided and that said method entails a continuous digging operation that is performed while the machine is moved continuously along the ground.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A ditch digger comprising a wheel-mounted frame adapted to be moved along the ground, transversely spaced means for forming longitudinal furrows during movement of the frame, and means spanning between adjacent furrows for simultaneously forming cross channels connecting said adjacent furrows, one of the latter means being in advance of the means forming the furrows and the other being rearward thereof, whereby said other channel-forming means also fills in a dam of soil across each of the adjacent furrows to thereby interrupt the continuity of said adjacent furrows, said furrow-forming means comprising plowshares and said channel-forming means comprising scoops.

2. A ditch digger comprising a wheel-mounted frame adapted to be moved along the ground, three transversely spaced shares carried by said frame for forming three longitudinal furrows during movement of the frame, scoops spanning between adjacent furrows for simultaneously forming longitudinally spaced cross channels connecting said adjacent furrows, one of the scoops being in advance of the shares forming the furrows and the other being rearward thereof, whereby said rearward scoops means also fills in a dam of soil across each of the adjacent furrows to thereby interrupt the continuity of said adjacent furrows, and means driven by the wheels of said frame for moving the scoops spanning between the central and one outer furrow into channel-scooping position alternately with the scoops spanning between the central and the other outer furrow whereby said channels connecting the three furrows are staggered.

3. A machine for digging a ditch having the serpentine form of a Greek fret comprising at least three transversely spaced shares for forming spaced longitudinal furrows, a scoop forward of and extending between adjacent shares, a similar scoop rearward of said adjacent shares, and means to intermittently move said scoops to soil-scooping position for forming a pair of cross channels connecting adjacent furrows and simultaneously filling in the furrows between said cross channels.

4. A ditch digger comprising a towable wheel-mounted frame having three transversely spaced downwardly curved rear portions, a plowshare on each portion for digging a longitudinal furrow, cam means connected to be driven by the wheels during towing of the frame, a pivoted arm between each adjacent pair of said curved rear portions and associated with said cam means for pivotal movement alternately with respect to each other, a soil scoop on each arm forward of the plowshares for scooping out a transverse channel connecting adjacent furrows formed by the plowshares, and a second scoop on each arm rearward of the plowshares for simultaneously scooping out a second transverse channel also connecting said adjacent furrows and simultaneously filling in a dam across each of said adjacent furrows to interrupt the continuity thereof.

5. A ditch digger comprising a towable wheel-mounted frame having three transversely spaced downwardly curved rear portions, a plowshare on each portion for digging a longitudinal furrow, cam means connected to be driven by the wheels during towing of the frame, a pivoted arm between each adjacent pair of said curved rear portions and associated with said cam means for pivotal movement alternately with respect to each other, a soil scoop on each arm forward of the plowshares for scooping out a transverse channel connecting adjacent furrows formed by the plowshares, and a second scoop on each arm rearward of the plowshares for simultaneously scooping out a second transverse channel also connecting said adjacent furrows and simultaneously filling in a dam across each of said adjacent furrows to interrupt the continuity thereof, said plowshares and scoops, each depositing the soil removed thereby alongside the furrows and channels to form mounds that increase the water-holding capacity of said furrows and channels.

6. In a ditch digger, three transversely spaced shares for forming three longitudinal furrows, a movable member disposed between each adjacent pair of said three shares, means for alternately moving said members up and down with respect to the shares, and two scoops on each member and extending into transverse overlapping relation to the respective pairs of shares, one scoop on each member being forward of and the other rearward of said respective pairs of shares.

YERVANT LION.

REFERENCES CITED

The following references are of record in the file of this patent:

UNITED STATES PATENTS

| Number | Name | Date |
| --- | --- | --- |
| 1,184,329 | Dennis et al. | May 23, 1916 |
| 1,397,722 | Chewning | Nov. 22, 1921 |
| 1,503,626 | Belsley | Aug. 5 1924 |
| 1,507,218 | Trapnell | Sept. 2, 1924 |
| 2,118,462 | Doonan | May 24, 1938 |